United States Patent
Johnson et al.

(10) Patent No.: US 8,904,752 B2
(45) Date of Patent: Dec. 9, 2014

(54) INJECTOR ASSEMBLY FOR A ROCKET ENGINE

(75) Inventors: Bradley C. Johnson, Palm Beach Gardens, FL (US); Randolph T. Lyda, Tequesta, FL (US); Ryan W. Brandt, Jupiter, FL (US); Mark J. Ricciardo, Royal Palm Beach, FL (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 907 days.

(21) Appl. No.: 13/028,779

(22) Filed: Feb. 16, 2011

(65) Prior Publication Data

US 2011/0219743 A1 Sep. 15, 2011

Related U.S. Application Data

(60) Provisional application No. 61/313,311, filed on Mar. 12, 2010.

(51) Int. Cl.
*F02K 9/52* (2006.01)
*B05B 7/10* (2006.01)

(52) U.S. Cl.
CPC .... *F02K 9/52* (2013.01); *B05B 7/10* (2013.01)
USPC ............................................. 60/258; 239/399

(58) Field of Classification Search
CPC ............... F02K 9/52; F02K 9/62; F02K 9/64; B05B 7/066; B05B 7/10
USPC ................... 60/257, 258, 260, 267, 741, 748; 239/399, 403, 424, 464; 141/59, 206; 137/543.15, 454.5; 251/126
See application file for complete search history.

(56) References Cited

U.S. PATENT DOCUMENTS

| | | | |
|---|---|---|---|
| 1,931,761 A * | 10/1933 | Hertel | 239/204 |
| 2,320,339 A * | 6/1943 | Buttner | 137/469 |
| 3,149,643 A * | 9/1964 | Breitsprecher | 137/469 |
| 3,940,066 A * | 2/1976 | Hunter | 239/204 |
| 4,006,719 A * | 2/1977 | Kanda et al. | 239/403 |
| 5,265,415 A * | 11/1993 | Cox, Jr. | 60/258 |
| 5,605,287 A * | 2/1997 | Mains | 239/402 |
| 5,683,034 A | 11/1997 | Johnson et al. | |
| 5,893,518 A | 4/1999 | Bruchez, Jr. et al. | |
| 6,370,867 B1 * | 4/2002 | Schnoor | 60/258 |
| 7,373,774 B2 | 5/2008 | Clark et al. | |
| 7,621,119 B2 | 11/2009 | Brown et al. | |
| 7,640,726 B2 | 1/2010 | Fang et al. | |
| 7,775,460 B2 | 8/2010 | Berg et al. | |
| 2008/0264035 A1 | 10/2008 | Ricciardo | |
| 2008/0310933 A1 | 12/2008 | Ricciardo | |
| 2010/0064661 A1 * | 3/2010 | Seo et al. | 60/258 |
| 2010/0257839 A1 | 10/2010 | Watkins et al. | |

* cited by examiner

*Primary Examiner* — J. Gregory Pickett
(74) *Attorney, Agent, or Firm* — Joel G Landau

(57) ABSTRACT

A cap for a liquid propellant injection assembly of a rocket engine includes a cap body and a valve assembly. The cap body extends between first and second ends. The cap body has a bore that fluidly connects one or more inlets to an outlet. The inlets are disposed in a tubular sidewall of the cap body. The outlet is disposed in the second end of the cap body. The valve assembly includes a valve cap disposed around the first end of the cap body. The valve assembly is adapted to selectively regulate flow of a propellant through the inlets in the cap body as a function of pressure exerted by the propellant against the valve assembly.

28 Claims, 4 Drawing Sheets

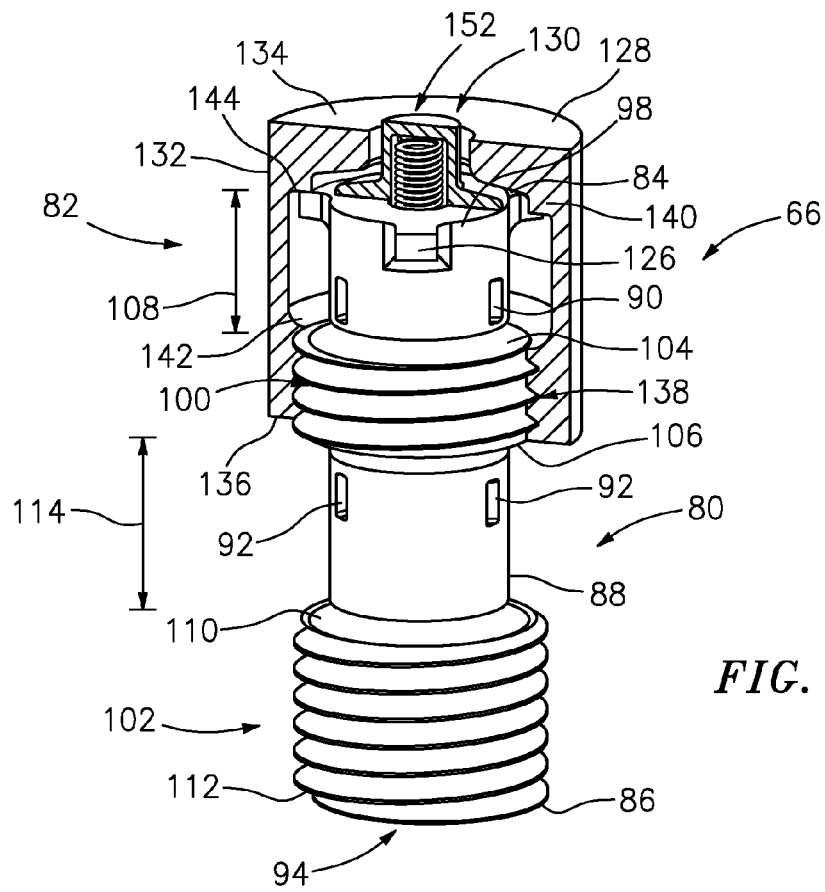
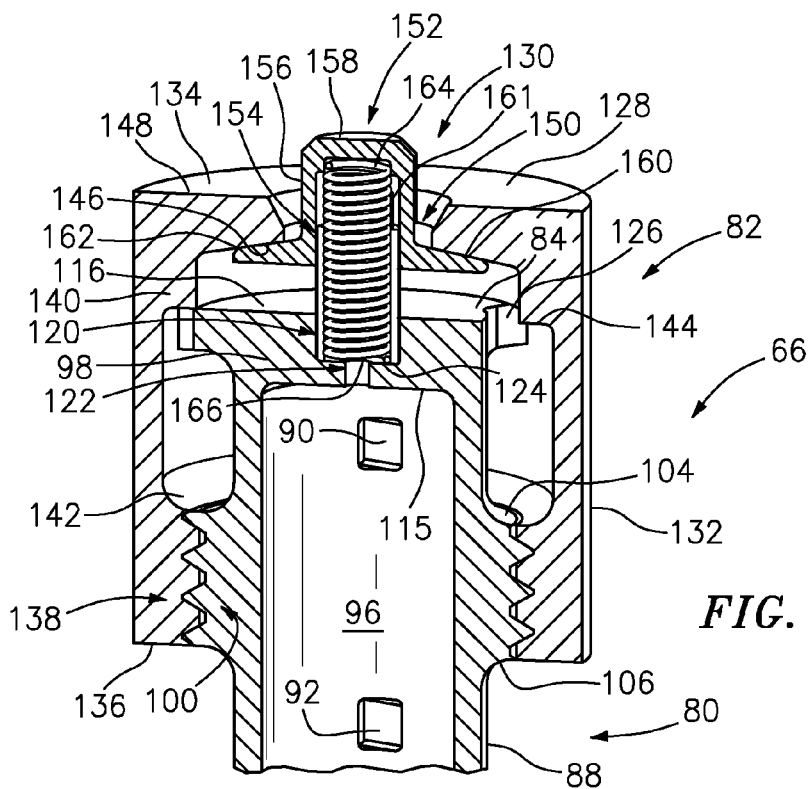

US 8,904,752 B2

INJECTOR ASSEMBLY FOR A ROCKET ENGINE

This application claims priority to U.S. Provisional Appln. No. 61/313,311 filed Mar. 12, 2010, which is hereby incorporated by reference.

BACKGROUND

1. Technical Field

This disclosure relates generally to an injector assembly for a rocket engine and, more particularly, to an injector assembly having a pressure actuated valve.

2. Background Information

Certain modern rocket engines are adapted for deep throttling maneuvers in order to provide soft landings, orbital transfers, etc. The term "deep throttling" is used herein to describe a process of decreasing engine thrust from full throttle to generally less than thirty percent of full throttle.

Flow of liquid propellants, such as liquid hydrogen and liquid oxygen (also referred to as "LOX"), through an injector assembly into a combustion chamber is greatly decreased during a typical deep throttling maneuver. As the flow of the propellants decreases, the pressure exerted by the propellants in the injector assembly can begin to approach the pressure of combusted gases in the combustion chamber. The pressure differential between the propellants in the injector assembly and the combusted gases in the combustion chamber, therefore, can be relatively small when engine thrust is at substantially less than full throttle. If the pressure differential becomes small enough it can cause poor performance or poor combustion stability during deep throttling maneuvers. A small pressure differential, for example, can reduce atomization, vaporization and mixing of the propellants as they are injected into the combustion chamber. The flow of propellant into the combustion chamber can also be perturbed by low combustion chamber pressure perturbations, which can create additional combustion instability.

Certain rocket engines include a propellant injector assembly with a plurality of manifolds in order to maintain a sufficient pressure differential during deep throttling maneuvers. Such an injector assembly adjusts the quantity of propellant injected into the combustion chamber by switching between one or more of the manifolds, while maintaining propellant pressure in each manifold within a certain range. The flow of propellant into the combustion chamber therefore can be decreased without also substantially decreasing the pressure differential across the injector assembly. Each manifold, however, typically has a large internal volume that must be purged during, for example, low power operation of a primary booster. Such purging can disadvantageously create combustion instabilities caused by lower hydraulic stiffness of the injector assembly.

BRIEF DESCRIPTION OF THE DRAWINGS

FIG. 3A is a partial sectional diagrammatic illustration of an embodiment of a swirl cap that includes a poppet assembly in a first (or open) position.

FIG. 3B is a sectional diagrammatic illustration of a portion of the swirl cap in FIG. 3A, where the poppet assembly is in a second (or closed) position.

DETAILED DESCRIPTION OF THE INVENTION

Figure 1:
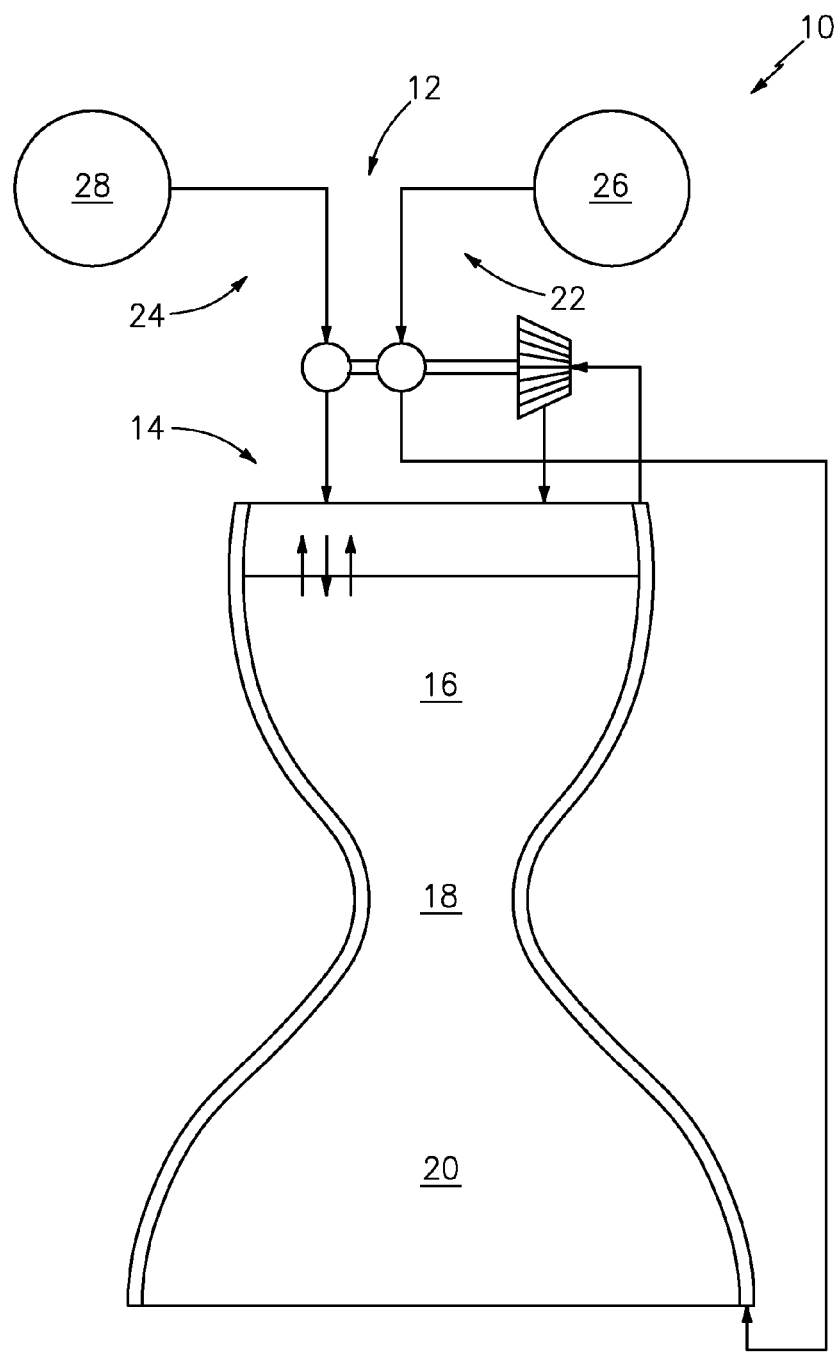
FIG. 1 is a schematic diagram of an embodiment of a rocket engine that includes a propellant injection system.

Referring to FIG. 1, an embodiment of a rocket engine 10 is schematically shown. The rocket engine 10 includes a propellant delivery system 12, a propellant injection system 14, an ignition system (not shown), a combustion chamber 16, a throat 18 and a nozzle 20. The propellant delivery system 12 includes a fuel delivery system 22 and an oxidizer delivery system 24.

During operation of the engine, the fuel delivery system 22 delivers fuel, such as liquid kerosene, methane or hydrogen, provided from a fuel tank 26 to the propellant injection system 14. The oxidizer delivery system 24 delivers oxidizer, such as liquid oxygen, provided from an oxidizer tank 28 to the propellant injection system 14. The propellant injection system 14 injects the fuel and oxidizer into the combustion chamber 16 providing an atomized fuel and oxidizer mixture. The fuel and oxidizer mixture is ignited by the ignition system, and thereafter directed through the throat 18 and out of the nozzle 20 to provide thrust. Additional details regarding the general configuration and operation of such a rocket engine are disclosed in U.S. Pat. Nos. 7,621,119 and 7,640,726, each of which is hereby incorporated by reference in its entirety.

Figure 2:
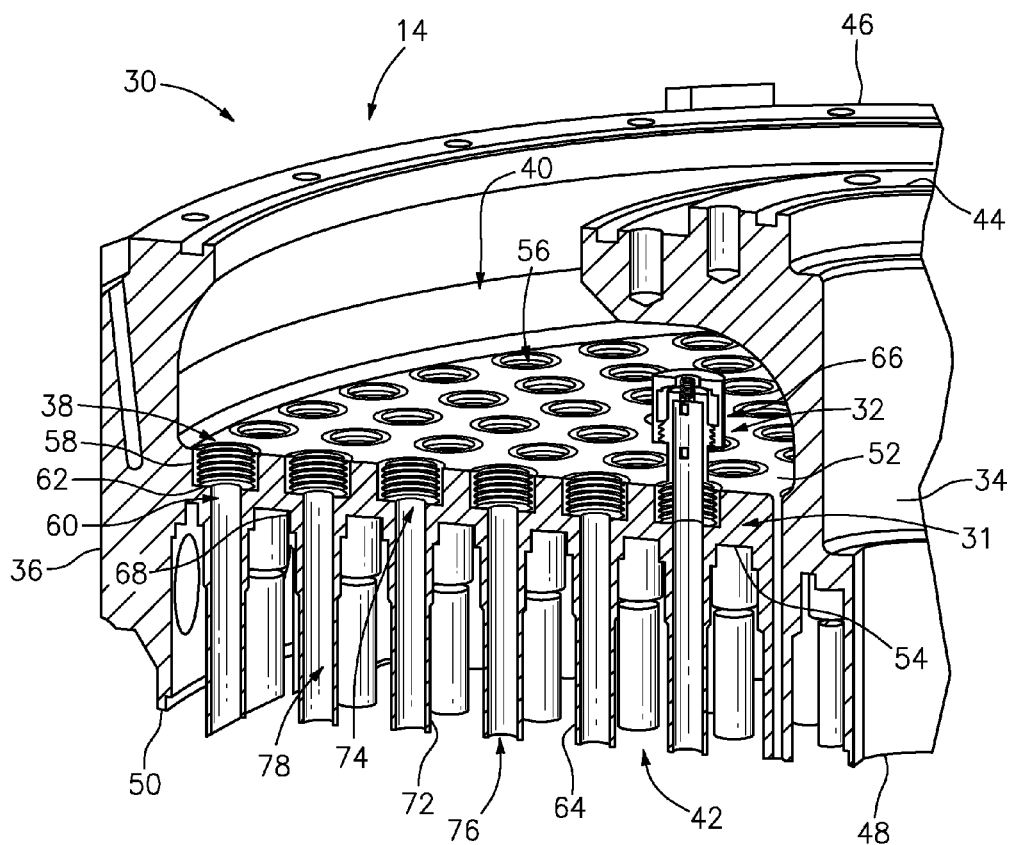
FIG. 2 is a sectional diagrammatic illustration of a partially assembled embodiment of the propellant injection system in FIG. 1.

Referring to FIG. 2, an embodiment of the propellant injection system 14 is diagrammatically shown. The propellant injection system 14 includes a housing 30 and a plurality of liquid propellant injector assemblies 31. Each liquid propellant injector assembly 31 includes a fuel sleeve (not shown) and an oxidizer injection assembly 32 (hereinafter "injector assembly"). In order to simplify the drawings, however, FIG. 2 only shows one complete injector assembly 32.

The housing 30 has an inner tubular sidewall 34 (hereinafter "inner sidewall"), an outer tubular sidewall 36 (hereinafter "outer sidewall"), and an inter-propellant barrier plate 38 fluidly separating an oxidizer chamber 40 from a fuel chamber 42. The inner and outer sidewalls 34 and 36 each extend axially between a first end 44, 46 (e.g., an upstream end) and a second end 48, 50 (e.g., downstream end), respectively. The inter-propellant barrier plate 38 extends radially between the inner and outer sidewalls 34 and 36 of the housing 30. The inter-propellant barrier plate 38 has an oxidizer chamber surface 52, a fuel chamber surface 54 and a plurality of apertures 56. The apertures 56 are arranged in a plurality of rows. Each row of apertures 56 radially extends between the inner and outer sidewalls 34 and 36 of the housing 30. In the specific embodiment shown in FIG. 2, each aperture 56 has a threaded mounting region 58 and an oxidizer flow passage 60. The threaded mounting region 58 has a diameter, and extends axially from the oxidizer chamber surface 52 to the oxidizer flow passage 60. The oxidizer flow passage 60 has a diameter, and extends axially from the threaded mounting region 58 to the fuel chamber surface 54. The diameter of the oxidizer flow passage 60 is less than the diameter of the threaded mounting region 58, thereby defining an annular shoulder 62 between the two regions 58 and 60 of each aperture 56. The oxidizer chamber 40 extends radially between the inner and outer sidewalls 34 and 36 of the housing 30. The fuel chamber 42 extends radially between the inner and outer sidewalls 34 and 36 of the housing 30.

Each injector assembly 32 includes an oxidizer post 64 and a swirl cap 66 (also referred to as a propellant or oxidizer regulator). The oxidizer post 64 has a tubular sidewall 72, an inlet 74 and an outlet 76. The tubular sidewall 72 defines a bore 78 that extends axially between and fluidly connects the inlet 74 and the outlet 76.

Figure 3C:
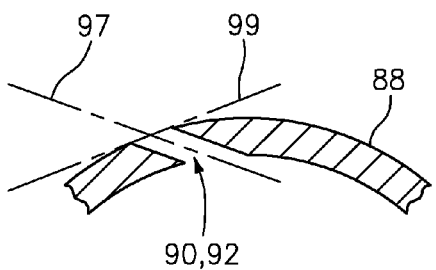
FIG. 3C is a partial cross-sectional diagrammatic illustration of the swirl cap in FIG. 3A.

Referring to FIGS. 3A to 3B, the swirl cap 66 includes a swirl cap body 80 and a valve assembly 82. The swirl cap body 80 (also referred to as a "swirl element") extends axially between a first end 84 (e.g., an upstream end) and a second end 86 (e.g., downstream end). The swirl cap body 80 has a tubular sidewall 88, one or more inlets 90, 92, an outlet 94 and a bore 96. The inlets 90, 92 are disposed in, and arranged circumferentially around the tubular sidewall 88. Referring to FIG. 3C, in some embodiments, each inlet 90, 92 extends along an axis 97 that is angled (e.g., acute) relative to a tangential plane 99 of an outer surface 98 of the tubular sidewall 88. Referring again to FIGS. 3A and 3B, the outlet 94 is disposed in the second end 86 of the swirl cap body 80. The bore 96 fluidly connects the inlets 90 and 92 to the outlet 94. The bore 96 has a diameter substantially equal to the diameter of the oxidizer flow passage 60 of the apertures 56 in the inter-propellant barrier plate 38.

The valve assembly 82 (also referred to as a "pressure actuated cap") is mounted relative to the first end 84 of the swirl cap body 80. The valve assembly 82 is adapted to selectively regulate flow of a propellant through the one or more inlets 90 (also referred to as "secondary orifices") in the swirl cap body 80, which will be described below in further detail.

Referring to the specific embodiment shown in FIGS. 3A and 3B, the tubular sidewall 88 of the swirl cap body 80 extends axially from an end wall 98 to the second end 86 of the swirl cap body 80. The tubular sidewall 88 has a first outer threaded region 100 (hereinafter "first threaded region") and a second outer threaded region 102 (hereinafter "second threaded region"). The first threaded region 100 extends axially from a first end 104 to a second end 106. The first end 104 of the first threaded region 100 is disposed a distance 108 from the first end 84 of the swirl cap body 80. The second threaded region 102 extends axially from a first end 110 to a second end 112. The first end 110 of the second threaded region 102 is disposed a distance 114 from the second end 106 of the first threaded region 100. The second end 112 of the second threaded region 102 is adjacent the second end 86 of the swirl cap body 80.

The end wall 98 of the swirl cap body 80 has an inner surface 115, an outer surface 116 and a co-axial central pocket 120 and a vent 122. The central pocket 120 has a diameter, and extends axially from the outer surface 116 of the end wall 98 to the vent 122. The vent 122 has a diameter, and extends from the central pocket 120 to the inner surface 115 of the end wall 98. The diameter of the vent 122 is smaller than the diameter of the central pocket 120, thereby defining an annular shoulder 124 therebetween.

The inlets 90, 92 disposed in the swirl cap body 80 are arranged in two sets, each including one or more of the inlets 90, 92. The first set of inlets 90 is disposed axially between the end wall 98 and the first threaded region 100 of the tubular sidewall 88. The second set of inlets 92 is disposed axially between the first and second threaded regions 100 and 102 of the tubular sidewall 88.

The swirl cap body 80 can also have one or more radially extending protrusions 126. The protrusions 126 are disposed adjacent to, and arranged circumferentially around the first end 84 of the swirl cap body 80. The protrusions 126 are adapted as grips for installing the swirl cap body 80 onto the housing 30. The protrusions 126 are also adapted as end stops for the valve assembly 82.

The valve assembly 82 includes a valve cap 128 and a poppet assembly 130. The valve cap 128 has a tubular sidewall 132 that extends axially from an end wall 134 to a second end 136. The tubular sidewall 132 has an inner threaded region 138 and an inner annular shoulder 140. The inner threaded region 138 extends axially from the second end 136 of the valve cap 128, in a direction towards the end wall 134, to a first end 142. The inner annular shoulder 140 extends axially from the end wall 134, in a direction towards the second end 136 of the valve cap 128, to a second end 144. Referring to FIG. 3B, the end wall 134 of the valve cap 128 has an inner seal surface 146, an outer surface 148 and a central inlet 150. The central inlet 150 (also referred to as a "primary orifice") has a diameter, and extends from the outer surface 148 to the inner seal surface 146. In some embodiments, the central inlet 150 has a beveled region adjacent the outer surface 148 of the end wall 134.

The poppet assembly 130 includes a plug 152 and a spring element 154. The plug 152 has a tubular sidewall 156 that extends axially between an end wall 158 and a flange 160 defining an inner pocket 161. The tubular sidewall 156 has an outer diameter that is less than the diameter of the central inlet 150 in the end wall 134 of the valve cap 128. The flange 160 extends radially out from, and circumferentially around the tubular sidewall 156 of the plug 152. The flange 160 has a seal surface 162 disposed adjacent the outer surface of the tubular sidewall 156 of the plug 152. The spring element 154 (e.g., a helical spring disposed within a support sleeve) has a first end 164, a second end 166, an axial length and a spring rate. The axial length extends from the first end 164 to the second end 166.

The spring element 154 is configured, between the plug 152 and the swirl cap body 80, to bias the seal surface 162 of the plug 152 against the inner seal surface 146 of the end wall 134 of the valve cap 128. The first end 164 of the spring element 154 is disposed in the inner pocket 161 in the plug 152, and is abutted against the plug end wall 158. The second end 166 of the spring element 154 is disposed in the spring mounting region 120 of the central aperture in the swirl cap body 80, and is abutted against the annular shoulder 124. The tubular sidewall 156 of the plug 152 is disposed concentrically within the central inlet 150 of the valve cap 128. The inner threaded region 138 of the valve cap 128 is mated with the first threaded region 100 of the tubular sidewall 88 of the swirl cap body 80.

Referring again to FIG. 2, the second threaded region 102 of the swirl cap body 80 for each injector assembly 32 is mated with the threaded mounting region 58 of a respective one of the apertures 56 in the inter-propellant barrier plate 38. The oxidizer post 64 for each injector assembly 32 is formed integrally with the inter-propellant barrier plate 38 such that the oxidizer post bore 78 is fluidly connected to a respective one of the apertures 56 in the inter-propellant barrier plate 38. In alternative embodiments, however, the first end 68 of the oxidizer post 64 for each injector assembly 32 can be mechanically connected to the inter-propellant barrier plate 38.

Figure 4A:
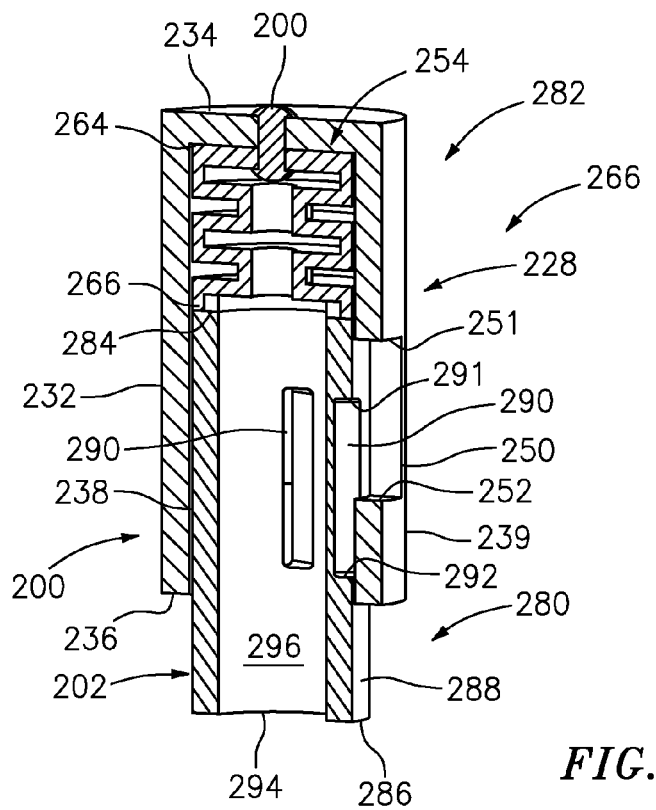
FIG. 4A is sectional diagrammatic illustration of an alternative embodiment of a swirl cap that includes a valve cap in a first position.
Figure 4B:
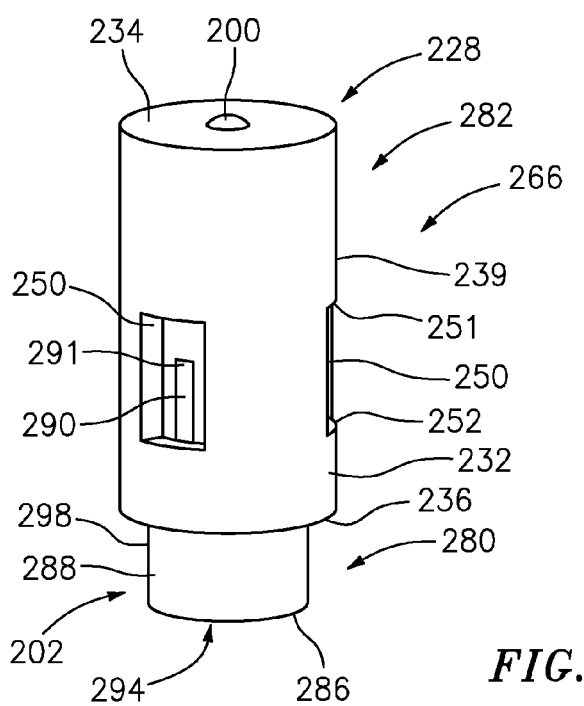
FIG. 4B is a diagrammatic illustration of the alternative embodiment of the swirl cap in FIG. 4A, where the valve cap is in a second position.

Referring to the alternate embodiment shown in FIGS. 4A and 4B, the tubular sidewall 288 of the swirl cap body 280 extends axially between the first and second ends 284 and 286 of the swirl cap body 280. The tubular sidewall 288 has a mounting region 202 and a slide bearing region 200. The mounting region 202 is disposed adjacent the second end 286 of the swirl cap body 280. The mounting region 202 can be adapted to mate with the inter-propellant barrier plate 38 via a mechanical connection (e.g., a threaded connection or a brazed connection). The slide bearing region 200 is disposed adjacent the first end 284 of the swirl cap body 280. The inlets 290 are disposed in the slide bearing region 200. Each inlet 290 has a first end 292, a second end 292, a height and a width. The height of each inlet extends axially between the first and second ends 291 and 292.

The valve assembly 282 includes a valve cap 228 and a spring element 254. The valve cap 228 has a tubular sidewall 232 that extends between an end wall 234 and a second end 236. The tubular sidewall 232 has an inner slide bearing surface 238, an outer surface 239 and one or more inlets 250. The inlets 250 are arranged circumferentially around the tubular sidewall 232. Each inlet 250 extends from the outer surface 239 to the inner slide bearing surface 238. Each inlet 250 has a first end 251, a second end 252, a height and a width. The height of each inlet 250 extends axially between the first and second ends 251 and 252. The height of each inlet 250 in the valve cap 228 is greater than or equal to the height of a respective one of the inlets 290 in the tubular sidewall 288 of the swirl cap body 280. In some embodiments, the width of each inlet 250 in the valve cap 228 is greater than the width of a respective one of the inlets 290 in the tubular sidewall 288 of the swirl cap body 280.

The spring element 254 can be configured as a resilient pressure vessel, such as a single or multi-tiered bellows, that compresses or expands as a function of an axial force applied thereto. The spring element 254 has a closed end 264, an open end 266, an axial length and a spring rate. The axial length extends from the closed end 264 to the open end 266.

The spring element 254 is arranged, within the valve cap 228 and between the end wall 234 of the valve cap 228 and the first end 284 of the swirl cap body 280, to bias the end wall 234 of the valve cap 228 away from the first end 284 of the swirl cap body 280. The closed end 264 of the spring element 254 is connected to the end wall 234 of the valve cap 228 via, for example, a fastener 200. The open end 266 of the spring element 254 is connected to the first end 284 of the swirl cap body 280 via, for example, a welded or brazed connection. Alternatively, the spring element 254 can be formed as an integral part of the swirl cap body 280. The slide bearing region 200 of the swirl cap body 280 is slidably mated with the inner slide bearing surface 238 of the valve cap 228.

Referring to FIGS. 2, 3A and 3B, during operation of the propellant injection system 14 shown in FIG. 2, the oxidizer chamber 40 is pressurized with the oxidizer provided from the oxidizer delivery system 24 (see FIG. 1). The pressurized oxidizer is directed through one or more of the inlets 90, 92 in each swirl cap 66 into the bore 96 of the swirl cap body 80. The pressurized oxidizer in the bore 96 of the swirl cap body 80 is directed, through the oxidizer flow passage 60 in a respective one of the apertures 56 in the inter-propellant barrier plate 38, into the bore 78 of the oxidizer post 64. The pressurized oxidizer in the bore 78 of the oxidizer post 64 is then injected into the combustion chamber 16 through the outlet 76 in the oxidizer post 64.

The quantity of oxidizer injected into the combustion chamber 16 can be selectively regulated by increasing or decreasing the pressure in the oxidizer chamber 40. For example, referring to the swirl cap 66 shown in FIGS. 3A and 3B, the spring element 154 exerts a spring bias force between the plug 152 and the swirl cap body 80. The spring bias force biases the seal surface 162 of the plug 152 towards the inner seal surface 146 of the valve cap end wall 134. The pressurized oxidizer residing in the oxidizer chamber 40 exerts a pressure bias force, in a direction opposite the spring bias force, between the plug 152 and the oxidizer chamber 40. The pressure bias force biases the seal surface 162 of the plug 152 away from the inner seal surface 146 of the valve cap end wall 134. Thus, when the spring bias force is greater than the pressure bias force (see FIG. 3B), the seal surface 162 of the plug 152 is pushed against and, therefore, forms a seal with the inner seal surface 146 of the end wall 134 of the valve cap 128. As a result, a first quantity of pressurized oxidizer flows into the swirl cap bore 96 through the second set of inlets 92 in the swirl cap body 80. When the spring bias force is less than the pressure bias force (see FIG. 3A), in contrast, the seal surface 162 of the plug 152 is pushed away from the inner seal surface 146 of the valve cap end wall 134 such that the plug 152 is pushed against the swirl cap end wall 98. As a result, a second quantity of pressurized oxidizer flows into the swirl cap bore 96 through both the first and second sets of inlets 90 and 92 in the swirl cap body 80. The second quantity of pressurized oxidizer is greater than the first quantity of pressurized oxidizer.

Referring to the alternate embodiment of the swirl cap 266 shown in FIGS. 4A and 4B, the spring element 254 exerts a spring bias force between the valve cap 228 and the swirl cap body 280. The spring bias force biases the valve cap 228 away from the swirl cap body 280. The pressurized oxidizer exerts a pressure bias force, in a direction opposite the spring bias force, between the valve cap 228 and the oxidizer chamber 40, biasing the valve cap 228 towards the swirl cap body 280. If the spring bias force is greater than the pressure bias force (see FIG. 4A), the valve cap 228 is pushed away from the swirl cap body 280. The second end 252 of each inlet 250 in the valve cap 228, therefore, slides toward the first end 291 of each inlet 290 in the swirl cap body 280. As the two ends 252 and 291 approach one another, the flow of oxidizer into the swirl cap bore 296 is restricted from the oxidizer chamber 40. The flow of oxidizer is restricted because the flow areas of the inlets 250 and 290 decrease. If, on the other hand, the spring bias force is less than the pressure bias force (see FIG. 4B), the valve cap 228 is pushed towards the swirl cap body 280. The second ends 252 of the inlets 250 in the valve cap 228, therefore, slide away from the first ends 291 of the inlets 290 in the swirl cap body 280, thereby increasing the flow of oxidizer into the swirl cap bore 296 from the oxidizer chamber 40. The flow of oxidizer into the swirl cap bore 296 increases because the flow areas of the inlets 250 and 290 increase.

While various embodiments of the propellant injection system have been disclosed, it will be apparent to those of ordinary skill in the art that many more embodiments and implementations are possible. For example, when the injector assembly 32 includes a plurality of swirl caps 66, the swirl caps 66 can be arranged into a plurality of subsets. In this manner, the spring elements in the swirl caps 66 of each subset can be configured with a different spring rate such that the quantity of oxidizer injected into the combustion chamber 16 can be increased or decreased at various pressure points. In another example, one or more of the aforedescribed threaded connections can be replaced by brazed, welded, or adhesive connections. Alternatively, one or more of the aforedescribed brazed or welded connections can be replaced by threaded or adhesive connections. Accordingly, the disclosed propellant injection system and its components are not to be restricted except in light of the attached claims and their equivalents.

What is claimed is:

1. An injector for a liquid propellant injection assembly of a rocket engine, comprising:

a swirl element extending between first and second ends, the swirl element has a bore that connects a secondary orifice to an outlet, the secondary orifice is disposed in a sidewall of the swirl element, the outlet is disposed in the second end of the swirl element, and the secondary orifice extends along an axis, the axis inclined relative to a tangential plane of an outer surface of the sidewall; and a pressure actuated cap disposed around the first end of the swirl element, the pressure actuated cap is adapted to regulate flow of a propellant through the secondary orifice as a function of pressure exerted by the propellant against the pressure actuated cap.

2. The injector of claim 1, wherein the pressure actuated cap has a primary orifice, and is adapted to regulate flow of the propellant through the secondary orifice by regulating flow of the propellant through the primary orifice.

3. The injector of claim 2, wherein the sidewall of the swirl element extends from an end wall to the second end of the swirl element, the sidewall has an outer mounting region disposed a distance from the first end of the swirl element;

the pressure actuated cap has a tubular sidewall that extends from an end wall to a second end, the tubular sidewall has an inner mounting region disposed adjacent the second end of the swirl element; and the inner mounting region of the tubular sidewall of the pressure actuated cap is connected to the outer mounting region of the sidewall of the swirl element.

4. The injector of claim 3, wherein the primary orifice is centrally located in the end wall of the pressure actuated cap;

the end wall of the pressure actuated cap has an inner seal surface; and the pressure actuated cap further includes a poppet assembly including a plug and a spring element, the plug has a seal surface, and the spring element is disposed between the plug and the end wall of the pressure actuated cap and biases the seal surface of the plug against the inner seal surface of the end wall of the pressure actuated cap.

5. The injector of claim 3, wherein the secondary orifice is disposed between the end wall of the swirl element and the outer mounting region of the sidewall of the swirl element; and the swirl element includes an additional inlet disposed between the outer mounting region of the sidewall of the swirl element and the second end of the swirl element.

6. The injector of claim 2, wherein the sidewall of the swirl element extends from the first end to the second end of the swirl element;

the pressure actuated cap has a tubular sidewall that extends from an end wall to a second end;

the primary orifice is disposed in the tubular sidewall of the pressure actuated cap, and is circumferentially aligned with the secondary orifice; and the tubular sidewall of the pressure actuated cap is disposed around and slidably mated with the sidewall of the swirl element.

7. The injector of claim 6, wherein the pressure actuated cap further includes a spring element that extends from a closed end to an open end, the closed end of the spring element is connected to the end wall of the pressure actuated cap, and the open end of the spring element is connected to the first end of the swirl element.

8. The injector of claim 7, wherein the spring element is adapted to regulate flow of the propellant through the secondary orifice by adjusting relative axial position between the secondary orifice and the primary orifice.

9. The injector of claim 7, wherein the spring element comprises a bellows.

10. The injector of claim 1, wherein the axis is inclined at an acute angle relative to a tangential plane of an outer surface of the sidewall.

11. A cap for a liquid propellant injection assembly of a rocket engine, comprising:

a cap body extending between first and second ends, the cap body has a bore that fluidly connects one or more inlets to an outlet, the inlets are disposed in a tubular sidewall of the cap body, and the outlet is disposed in the second end of the cap body; and a valve assembly including a valve cap disposed around the first end of the cap body, the valve assembly is adapted to selectively regulate flow of a propellant through the inlets in the cap body as a function of pressure exerted by the propellant against the valve assembly, wherein the valve assembly further includes a poppet assembly including a plug and a spring element, the poppet assembly and the cap body being separate structures, the plug has a seal surface, and the spring element is disposed between the plug and an end wall of the cap body and biases the seal surface of the plug against the inner seal surface of the end wall of the valve cap.

12. The cap of claim 11, wherein the valve cap has one or more inlets; and the valve assembly is adapted to selectively regulate flow of the propellant through one or more of the inlets in the cap body by selectively regulating flow of the propellant through the one or more inlets in the valve cap.

13. The cap of claim 11, wherein the inlets in the cap body are arranged in a first set and a second set, each set including one or more of the inlets in the cap body;

the first set of the inlets in the cap body are disposed between the end wall of the cap body and the outer mounting region of the tubular sidewall of the cap body; and the second set of the inlets in the cap body are disposed between the outer mounting region of the tubular sidewall of the cap body and the second end of the cap body.

14. The cap of claim 11, wherein the end wall of the cap body has a vent.

15. The cap of claim 11, wherein one or more protrusions extend radially out from the first end of the cap body.

16. The cap of claim 12, wherein the tubular sidewall of the cap body extends from the first end to the second end of the cap body;

the valve cap has a tubular sidewall that extends from an end wall to a second end;

the inlets in the valve cap are disposed in the tubular sidewall of the valve cap, and are circumferentially aligned with the inlets in the cap body; and the tubular sidewall of the valve cap is disposed around and slidably mated with the tubular sidewall of the cap body.

17. The cap of claim 16, wherein the valve assembly further includes a spring element that extends from a closed end to an open end, the closed end of the spring element is connected to the end wall of the valve cap, and the open end of the spring element is connected to the first end of the cap body.

18. The cap of claim 17, wherein the spring element is adapted to selectively regulate flow of the propellant through the inlets in the cap body by adjusting relative axial position between the inlets in the cap body and the inlets in the valve cap.

19. The cap of claim 11, wherein the inlets disposed in the tubular sidewall of the cap body each extend along an axis inclined relative to a tangential plane of an outer surface of the sidewall.

20. A propellant injection system for a rocket engine, comprising:
a housing having an inter-propellant barrier plate fluidly separating an oxidizer chamber from a fuel chamber, the inter-propellant barrier plate has a oxidizer chamber surface, a fuel chamber surface and one or more apertures, each aperture extending from the oxidizer chamber surface to the fuel chamber surface; and
one or more injector assemblies, each injector assembly including a cap comprising:
a cap body extending between first and second ends, the cap body has a bore that fluidly connects one or more inlets to an outlet, the inlets are disposed in a tubular sidewall of the cap body, the outlet is disposed in the second end of the cap body, the cap body including radially extending protrusions disposed adjacent the first end, the cap body further including a threaded region spaced axially from the protrusions, the protrusions connecting the cap body to the housing; and
a valve assembly including a valve cap disposed around the first end of the cap body, the valve assembly is adapted to selectively regulate flow of oxidizer through the inlets in the cap body as a function of pressure exerted by the oxidizer against the valve assembly, the valve cap including an inner threaded region mating with the threaded region of the cap body.

21. The propellant injection system of claim 20, wherein each injector assembly further includes an oxidizer post having a bore; and
the bore of the cap body is fluidly connected to the bore in the oxidizer post through a respective one of the apertures in the inter-propellant barrier plate.

22. The propellant injection system of claim 20, wherein the valve cap has one or more inlets; and
the valve assembly is adapted to selectively regulate flow of the oxidizer through one or more of the inlets in the cap body by selectively regulating flow of the oxidizer through the one or more inlets in the valve cap.

23. The propellant injection system of claim 22, wherein the tubular sidewall of the cap body extends from an end wall to the second end of the cap body, the tubular sidewall has an outer mounting region disposed a distance from the first end of the cap body;
the valve cap has a tubular sidewall that extends from an end wall to a second end, the tubular sidewall has an inner mounting region disposed adjacent the second end of the valve cap; and
the inner mounting region of the tubular sidewall of the valve cap is connected to the outer mounting region of the tubular sidewall of the cap body.

24. The propellant injection system of claim 23, wherein
the one or more inlets in the valve cap comprise a central inlet in the end wall of the valve cap;
the end wall of the valve cap has an inner seal surface; and
the valve assembly further includes a poppet assembly including a plug and a spring element, the plug has a seal surface, and the spring element is disposed between the plug and the end wall of the cap body to bias the seal surface of the plug against the inner seal surface of the end wall of the valve cap.

25. The propellant injection system of claim 23, wherein
the inlets in the cap body are arranged in a first set and a second set, each set including one or more of the inlets in the cap body;
the first set of the inlets in the cap body are disposed between the end wall of the cap body and the outer mounting region of the tubular sidewall of the cap body; and
the second set of the inlets in the cap body are disposed between the outer mounting region of the tubular sidewall of the cap body and the second end of the cap body.

26. The propellant injection system of claim 20, wherein
the tubular sidewall of the cap body extends from the first end to the second end of the cap body;
the valve cap has a tubular sidewall that extends from an end wall to a second end;
the inlets in the valve cap are disposed in the tubular sidewall of the valve cap, and are circumferentially aligned with the inlets in the cap body; and
the tubular sidewall of the valve cap is disposed around and slidably mated with the tubular sidewall of the cap body.

27. The propellant injection system of claim 26, wherein the valve assembly further includes a spring element that extends from a closed end to an open end, the closed end of the spring element is connected to the end wall of the valve cap, and the open end of the spring element is connected to the first end of the cap body.

28. The propellant injection system of claim 27, wherein the spring element is adapted to selectively regulate flow of the oxidizer through the inlets in the cap body by adjusting relative axial position between the inlets in the cap body and the inlets in the valve cap.

* * * * *